United States Patent [19]

Bannink

[11] 4,305,422
[45] Dec. 15, 1981

[54] FILLER VALVE FOR A GAS TANK

[75] Inventor: Anton A. Bannink, Barchem, Netherlands

[73] Assignee: Industrieële Maatschappij Zutphen B.V., Zutphen, Netherlands

[21] Appl. No.: 140,734

[22] Filed: Apr. 16, 1980

[30] Foreign Application Priority Data

Jul. 24, 1979 [NL] Netherlands ............... 7905739

[51] Int. Cl.³ .................. F16K 21/18; F16K 31/18
[52] U.S. Cl. ............................ 137/415; 137/430; 137/449; 137/614.2; 251/44; 141/198
[58] Field of Search ............... 137/412, 413, 414, 415, 137/430, 442, 444, 446, 449, 614.2, 628; 141/198, 302; 251/46, 44, 29

[56] References Cited

U.S. PATENT DOCUMENTS

| | | | |
|---|---|---|---|
| 1,313,029 | 8/1919 | Storr | 137/430 |
| 2,213,753 | 9/1940 | Teahen | 137/414 |
| 2,376,628 | 5/1945 | Shanley | 141/198 |
| 2,758,811 | 8/1956 | Peterson | 251/44 |
| 3,929,155 | 12/1975 | Garretson | 141/198 |
| 4,064,907 | 12/1977 | Billington et al. | 141/198 |
| 4,201,362 | 5/1980 | Nishimi et al. | 251/44 |

Primary Examiner—Martin P. Schwadron
Assistant Examiner—G. L. Walton
Attorney, Agent, or Firm—Diller, Ramik & Wight

[57] ABSTRACT

A filler valve for a gas tank, comprising a valve body to be mounted in the wall of the tank, to the upper end of which body a filler hose can be connected, and in the wall of which valve body outlet ports are provided, two shut-off valves being provided in the valve body, between which shut-off valves a passage is present and furthermore the space between the two valve members is in open communication with the space under the valve members, said latter space comprising a passage opening controlled by a float, and in which furthermore the valves are constructed so as to be slidable one within the other and cooperate with one and the same seat.

44 Claims, 3 Drawing Figures

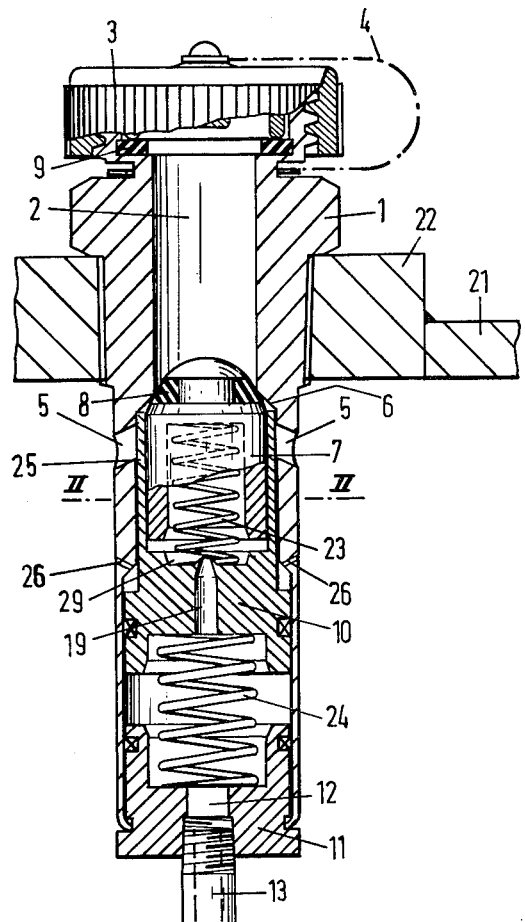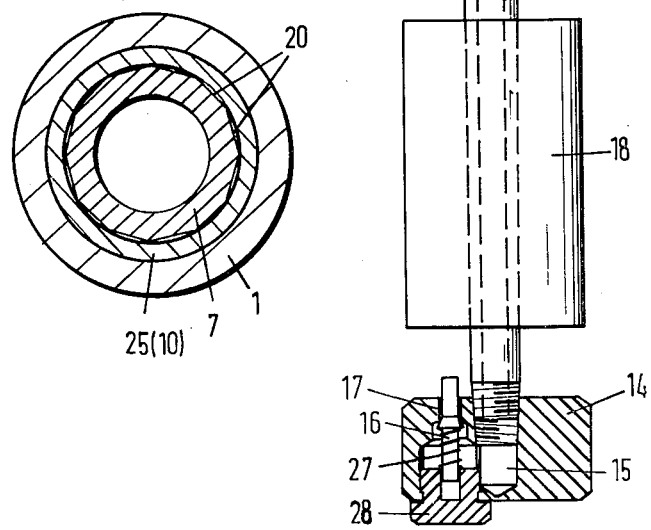

FILLER VALVE FOR A GAS TANK

The invention relates to a filler valve for a gas tank, comprising a valve body to be mounted in the wall of the tank, to the upper end of which body a filler hose can be connected, and in the wall of which valve body outlet ports are provided, two shut-off valves being provided in the valve body, between which shut-off valves a passage is present, and in which furthermore the space between the two valve members is in open communication with the space under the valve members, said latter space comprising a passage opening controlled by a float.

From considerations of safety a gas tank may not be filled as to more than 80%, in order to provide a possibility of expansion in the event of temperature fluctuations. Until now, this filling up to 80% has been effected by means of a valve separately mounted on the gas tank, which is to be observed during the filling operation. Often this is omitted, and the tank is filled up in the same way as, for example, a gasoline tank. Usually this does not become a direct hazard, because the tank has a separate safety valve. Completely filling the tank does constitute a hazard, however, if the vehicle or the like mounting the gas tank is placed in a closed space, for example, a garage, immediately after the filling. In that case an explosive gas mixture is formed in the closed space in the case of an increase in temperature.

Now, a filler valve of the kind defined in the opening paragraph of this specification is known from U.S. Pat. No. 3,929,155. That valve, however, is rather complicated and hence expensive. Moreover it is difficult of assembly and has a rather great structural height, both on the inside and on the outside of the tank.

It is an object of the invention to eliminate the disadvantages referred to.

For this purpose a filler valve of the kind defined in the opening paragraph is characterized in that the valves are constructed so as to be slidable one within the other. Furthermore, in this arrangement, the two valves may cooperate with one and the same seat.

With advantage, the two shut-off valves may be combined into a differential valve, which cooperates with portions of different diameter of the body passage.

In a further elaboration of the invention, the passage opening which connects the top side of the first shut-off valve with the bottom side of the second shut-off valve may be constituted by one or more channels provided between the inner and outer circumferences of the two valves and a bore provided in the second shut-off valve.

The bore provided in the second shut-off valve may be tapered in the direction of the first shut-off valve, whereby clogging of this passage is prevented.

Furthermore, the passage opening may communicate via a tube with a chamber provided with a connection aperture to the tank, which aperture is controlled by a spring-loaded plug, operated by the float.

Another possibility consists in this that the passage opening is provided with a seat on which a spring-loaded ball can seal, operated by a disc provided with one ore more recesses, which can be rotated by means of the float.

In illustration of the invention, some embodiments of the filler valve will now be described with reference to the drawings. In said drawings:

FIG. 1 shows a longitudinal sectional view of a filler valve;

FIG. 2 shows a cross-sectional view, taken on the line II—II of FIG. 1; and

Figure 3:
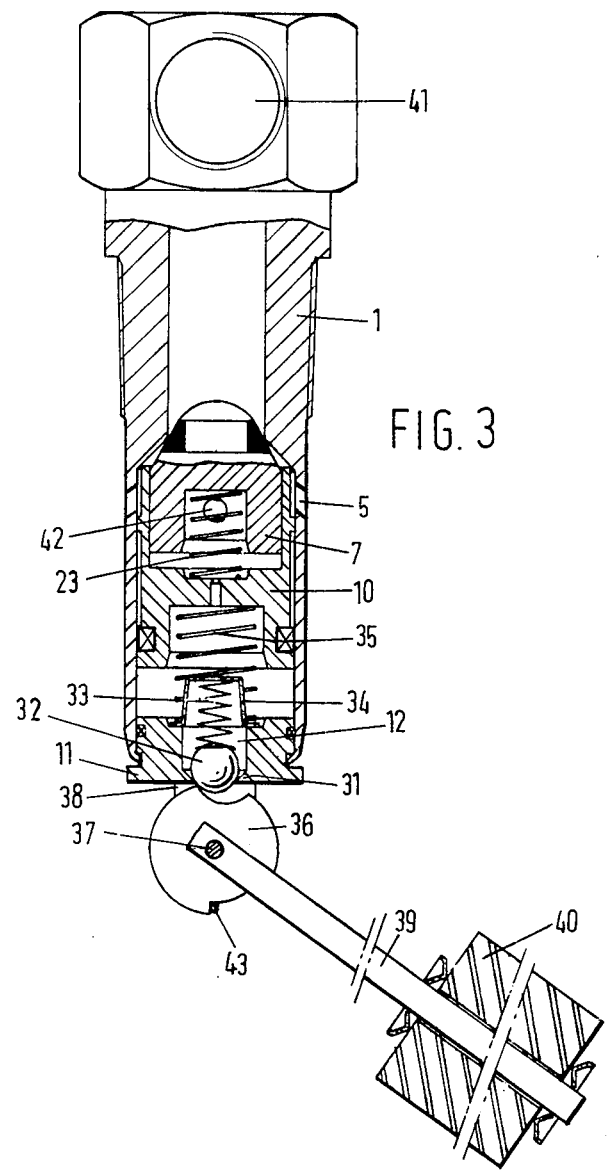
FIG. 3 shows a sectional view similar to FIG. 1 of a second embodiment of the filler valve.

According to FIG. 1, a filler valve is mounted by means of a fitting-plate 22 in a wall 21 of a gas tank and comprises a body 1 with a passage or bore 2. The upper end of the valve body is provided with screw thread adapted to cooperate with a coupling member (not shown) of a filling hose or with the cover 3 (shown in the drawing), which by means of a flexible strip of plastic 4, shown diagrammatically, is fixedly connected to the valve body. To ensure proper sealing, a sealing ring 9 is provided.

Valve body 1 is further provided with a plurality of outlet ports 5, disposed downstream of a seat 6 arranged to cooperate with a first shut-off valve 7, which is loaded by a spring 23, and provided at the front or top side with a resilient sealing element 8. Cooperating with shut-off valve 7 is a second shut-off valve 10, formed with greater diameters, and loaded by a spring 24, of which second shut-off valve the annular top portion 25 can seal on the same seat, namely 6, as the first shut-off valve 7.

It is observed in this connection that, in order to enable the second valve 10 to move in the broadened portion of the passage 2, passages 26 are formed in the wall of valve body 1 in this broadened portion.

The bottom of valve body 1 is closed with a cover 11. Secured in a passage 12 of this cover is a tube member 13, to the other end of which is secured an auxiliary housing 14. This auxiliary housing is provided with a chamber 15, which on the one hand, via said tube 13, is in open communication with the passage of housing 1, and on the other, via an aperture 17 that can be closed by means of a plug 16, biased by a spring 27, with the interior of the gas tank. Plug 16 and spring 27 can be mounted by virtue of a screw cap 28, which also serves as a guide for the lower end of plug 16.

Provided around the tube member is further a float 18, which can operate the spring-loaded plug 16.

In the second shut-off valve 10, there is further provided a bore 19, which terminates in a top recess 29 of the second shut-off valve 10. As appears from FIG. 2, there are further provided a plurality of passages 20 between the first shut-off valve 7 and the second shut-off valve 10, produced by flattening the circumference of the first shut-off valve 7.

The operation of the apparatus is as follows.

During the filling of an empty or substantially empty tank, float 18 will press the plug downwardly, as a result of which the interior of the gas tank will communicate via chamber 15 and tube member 13 with the space under the second shut-off valve 10.

This space is in turn in communication via bore 19, the space between the two valves, and the passages 20 with bore 2, as during the filling the two valves are pressed downwardly by the overpressure of the liquid supplied.

When the tank reaches a given degree of filling of, for example, 80%, float 18 will begin to float whereby opening 17 will be shut off. As a consequence, the pressure of the liquid in the space under the second shut-off valve and in the space between the two valves will become equal to the pump or filling pressure, owing to which the valves will close. A further advantage of the selected construction consists in that, once the float has moved upwardly, the spring-loaded plug 16 is subject to the pressure of the liquid supplied, i.e. the pump pressure, as a result of which plug 16 will remain closed, even if the float should move up and down under the influence of "waves" in the tank.

The desired degree of filling can be adjusted by a suitable selection of the length of tube member 13, which on one end is connected by means of screw thread with the cover 11 of valve body 1, and on the other end is connected by means of screw thread with the auxiliary housing 14.

As is further apparent from FIG. 1, the bore 19 in the second shut-off valve 10 is formed at the top with a conical end, owing to which the risk of clogging is minimized.

Of the embodiment shown in FIG. 3, hereinafter essentially those components will be described which differ from those shown in the first embodiment. In this second embodiment, the valve body is closed at the top. The portion concerned is constructed on the outside in the form of a hexagonal nut with a lateral screw-threaded opening 41 for receiving a plug not shown, to which a supply duct for liquid gas can be connected.

The portion housing the two telescoping shut-off valves is formed in a single diameter. Furthermore, shut-off valve 7 is provided with a lateral aperture 42, which constitutes an additional connection of the space between the two shut-off valves to the space above valve 7. As appears from FIG. 3, cover 11 at the bottom of the valve body is provided with a seat 31, on which a ball 32 can provide a seal, the ball being loaded by a spring 33. The other end of spring 33 bears on cap 34, which has a passage opening not shown. This cap 34 is kept in position against the cover by a spring 35 which is stronger than the spring 33.

The ball can be forced off its seat by means of a disc 36, provided with recesses, and mounted on a shaft 37, which is received for rotation in projection 38 of cover 11. Connected to disc 36 or shaft 37 is further a lever 39, which is equipped with a float 40. As soon as the level in the tank rises and the float starts to float, disc 36 will turn until a recess 41 thereof lies vertically under ball 32; the ball will then fall onto seat 31 and close the connection to the interior of the tank. In order to limit the rotation of the float there is provided a stop 43.

The constructions described provide for the closing of the shut-off valves under the influence of the pump pressure, with or without the help of springs 23, 24 and 23, 35 and ensure proper operation, even if the first shut-off valve or the second shut-off valve does not function properly or if one of the springs breaks.

In the manner described before, a filler valve is realized which is short, small and simple.

It is finally noted that a large number of modifications are possible within the scope of the inventive idea.

Thus, for example, instead of float 18, it would be possible to use a densitometer, whereby, instead of a degree of filling expressed in a percentage by volume, a degree of filling expressed in a percentage by weight can be obtained. It is also possible to incorporate a one-way valve for example in passage or bore 3 in order to prevent liquid or gas from flowing back in the event of failure of valves 7, 10 to close as a result, for example, of the deposition of dirt.

What I claim is:

1. A filler valve for a gas tank comprising a generally tubular body having an interior chamber adapted to receive therein fluid under pressure through an inlet, means defining first and second spaced valve seats past which fluid is adapted to flow from said chamber, first and second valve means for seating upon and being unseated relative to said respective first and second valve seats for controlling the flow of fluid through said chamber past said second valve seat, first and second biasing means for normally biasing said first and second valve means against said first and second valve seats, respectively, third valve means for seating upon and being unseated relative to a third valve seat, first and second fluid chambers set-off at least in part by and between said first and third valve means and said second and third valve means, said first and second biasing means being disposed generally on opposite sides of said third valve means, means defining a first fluid passage for placing said first and second chamber means in fluid communication, additional passage means for placing said first chamber means in fluid communication with the exterior of said tubular body, said first valve means being adapted to be unseated from said first valve seat in response to inlet fluid pressure to supply fluid to said second chamber through said first fluid passage to maintain said second valve means seated upon said second valve seat, said third valve means being unseated from said third valve seat upon the opening of said second valve means resulting in the flow of fluid past said first valve seat into said first chamber means and through said first fluid passage into said second chamber means, and means for automatically controlling the operation of said second valve means by seating the latter upon said second valve seat under the influence of a first predetermined fluid level being reached in an associated tank at balanced pressure on opposite sides of said first and third valve means whereby at least said first valve means is seated upon said first valve seat by said first biasing means and unseating the second valve means from said second valve seat under the influence of a second predetermined fluid level being reached which is less than said first predetermined fluid level in the associated tank at unbalanced pressure on opposite sides of said first valve means to unseat said first and third valve means relative to said first and third valve seats.

2. The filler valve as defined in claim 1 wherein said first fluid passage is formed in said third valve means.

3. The filler valve as defined in claim 1 wherein said additional passage means is at least in part formed in said tubular body.

4. The filler valve as defined in claim 1 wherein said additional passage means is at least in part formed between adjacent surfaces of said first and third valve means.

5. The filler valve as defined in claim 1 wherein said first fluid passage is formed in said third valve means, and said additional passage means is defined by a port in said tubular body and a port between adjacent surfaces of said first and third valve means.

6. The filler valve as defined in claim 5 wherein said first and third valve means are in relatively movable telescopic relationship to each other.

7. The filler valve as defined in claim 5 wherein at least one of said adjacent surfaces is other than concentric to the other of said surfaces.

8. The filler valve as defined in claim 5 wherein at least one of said adjacent surfaces is flat.

9. The filler valve as defined in claim 1 wherein said first and third valve seats are one and the same.

10. The filler valve as defined in claim 1 including futher passage means in said tubular body for directing fluid pressure such as to bias said second valve means toward its seated position upon said second seat.

11. The fuller valve as defined in claim 1 wherein said third valve means in part define said first chamber, and said first valve means is at least in part seated within said third valve means and said first chamber.

12. The filler valve as defined in claim 1 wherein said first valve means include an exterior peripheral surface in spaced relationship to an interior peripheral surface of said third valve means, and the spacing between said peripheral surfaces at least in part define said additional passage means.

13. The filler valve as defined in claim 12 wherein said first and third valve means are in relatively movable telescopic relationship to each other.

14. The filler valve as defined in claim 1 wherein said additional passage means is at least in part formed by a passage in said first valve means opening into said first chamber.

15. The filler valve as defined in claim 1 wherein said first fluid passage is formed in said third valve means, said additional passage means includes (a) a fluid passage in said first valve means opening through an exterior peripheral surface of said first valve means and being in fluid communication with said first chamber, (b) a fluid passage defined between said first valve means exterior peripheral surface and an interior peripheral surface of said third valve means, and (c) a passage in said tubular body opening to the exterior thereof.

16. The filler valve as defined in claim 1 wherein said controlling means includes a buoyant element.

17. The filler valve as defined in claim 1 wherein said controlling means includes a pivoted element for operating said second valve means, and said controlling means further includes a buoyant element carried by said pivoted element for pivoting the latter to operate the second valve means.

18. The filler valve as defined in claim 1 including third biasing means in said second chamber for normally biasing said third valve means in a direction toward said first valve means.

19. The filler valve as defined in claim 1 including third biasing means in said second chamber for normally biasing said third valve means in a direction toward said first valve means, and the strength of said third biasing means is greater then the strength of said second biasing means.

20. The filler valve as defined in claim 1 including third biasing means in said second chamber for normally biasing said third valve means in a direction toward said first valve means, and said second and third biasing means are spring disposed in generally coaxial relationship.

21. The filler valve as defined in claim 1 wherein said second biasing means is a spring, and means within said second chamber for seating said spring in biasing relationship to said second valve means.

22. The filler valve as defined in claim 1 wherein said second biasing means is a spring, means within said second chamber for seating said spring in biasing relationship to said second valve means, and said last-mentioned means being an apertured generally inverted cup-like element.

23. The filler valve as defined in claim 1 wherein said second biasing means is a spring, means within said second chamber for seating said spring in biasing relationship to said second valve means, said last-mentioned means being an apertured generally inverted cup-like element, said tubular body carrying an end fitting which defines said second valve seat, said cup-like element includes a peripheral flange seated upon said end fitting, and said second biasing means being a coil spring sandwich between said third valve means and said peripheral flange.

24. The filler valve as defined in claim 1 wherein said first and third valve means are in relatively movable telescopic relationship to each other.

25. The filler valve as defined in claim 24 wherein said first fluid passage is formed in said third valve means, said additional passage means includes (a) a fluid passage in said first valve means opening through an exterior peripheral surface of said first valve means and being in fluid communication with said first chamber, (b) a fluid passage defined between said first valve means exterior peripheral surface and an interior peripheral surface of said third valve means, and (c) a passage in said tubular body opening to the exterior thereof.

26. The filler valve as defined in claim 24 wherein said controlling means includes a buoyant element.

27. The filler valve as defined in claim 24 wherein said controlling means includes a pivoted element for operating said second valve means, and said controlling means further includes a buoyant element carried by said pivoted element for pivoting the latter to operate the second valve means.

28. The filler valve as defined in claim 24 wherein said second biasing means is a spring, and means within said second chamber for seating said spring in biasing relationship to said second valve means.

29. The filler valve as defined in claim 1 wherein said first fluid passage is formed in said third valve means, and said additional passage means includes a port through said first valve means communicating with a passage between said first and third valve means and a port in said tubular body opening to the exterior thereof.

30. A filler valve for a gas tank comprising a generally tubular body having an interior chamber adapted to receive therein fluid under pressure through an inlet, means defining first and second spaced valve seats past which fluid is adapted to flow from said chamber, first and second valve means for seating upon and being unseated relative to said respective first and second valve seats for controlling the flow of fluid through said chamber past said second valve seat, first and second biasing means for normally biasing said first and second valve means against said first and second valve seats, respectively, third valve means for seating upon and being unseated relative to a third valve seat, first and second fluid chambers disposed on opposite sides of said third valve means, biasing means being disposed generally on opposite sides of said third valve means, means defining a first fluid passage for placing said first and second chamber means in fluid communication, additional passage means for placing said first chamber means in fluid communication with the exterior of said tubular body, said first valve means being adapted to be unseated from said first valve seat in response to inlet fluid pressure to supply fluid to said second chamber through said first fluid passage to maintain said second valve means seated upon said second valve seat, said third valve means being unseated from said third valve seat upon the opening of said second valve means resulting in the flow of fluid past said first valve seat into said first chamber means and through said first fluid passage into said second chamber means, and means for automatically controlling the operation of said second valve means by seating the latter upon said second valve seat under the influence of a first predetermined fluid level being reached in an associated tank at balanced pressure on opposite sides of said first and third valve means whereby at least said first valve means is seated upon said first valve seat by said first biasing means and unseating the second valve means from said second valve seat under the influence of a second predetermined fluid level being reached which is less than said first predetermined third level in the associated tank at unbalanced pressure on opposite sides of said first valve means to unseat said first and third valve means relative to said first and third valve seats.

31. The filler valve as defined in claim 30 wherein said second valve means is disposed totally exteriorly of said interior chamber.

32. The filler valve as defined in claim 30 including a tubular conduit carried by said tubular body, a buoyant element disposed in sliding relationship relative to said tubular conduit, and said second valve means being disposed in a position to be operated upon relative motion of said buoyant element and said tubular conduit.

33. The filler valve as defined in claim 30 including a tubular conduit carried by said tubular body, a buoyant element disposed in sliding relationship relative to said tubular conduit, said second valve means being disposed in a position to be operated upon relative motion of said buoyant element and said tubular conduit, and said second valve means and said second valve seat being carried by said tubular conduit.

34. The filler valve as defined in claim 30 including a tubular conduit carried by said tubular body, a buoyant element disposed in sliding relationship relative to said tubular conduit, said second valve being disposed in a position to be operated upon relative motion of said buoyant element and said tubular conduit, said second valve means and said second valve seat being carried by said tubular conduit, and said second valve means and buoyant element being movable along generally parallel paths.

35. The filler valve as defined in claim 30 wherein said first fluid passage is formed in said third valve means.

36. The filler valve as defined in claim 30 wherein said additional passage means is at least in part formed in said tubular body.

37. The filler valve as defined in claim 30 wherein said additional passage means is at least in part formed between adjacent surfaces of said first and third valve means.

38. The filler valve as defined in claim 30 wherein said first fluid passage is formed in said third valve means, and said additional passage means is defined by a port in said tubular body and a port between adjacent surfaces of said first and third valve means.

39. The filler valve as defined in claim 30 wherein said third valve means in part defines said first chamber, and said first valve means is at least in part seated within said third valve means and said first chamber.

40. The filler valve as defined in claim 30 wherein said first valve means includes an exterior peripheral surface in spaced relationship to an interior peripheral surface of said third valve means, and the spacing between said peripheral surfaces at least in part define said additional passage means.

41. The filler valve as defined in claim 30 wherein said first fluid passage is formed in said third valve means, said additional passage means includes (a) a fluid passage in said first valve means opening through an exterior peripheral surface of said first valve means and being in fluid communication with said first chamber, (b) a fluid passage defined between said first valve means exterior peripheral surface and an interior peripheral surface of said third valve means, and (c) a passage in said tubular body opening to the exterior thereof.

42. The filler valve as defined in claim 41 wherein said first and third valve means are in relatively movable telescopic relationship to each other.

43. The filler valve as defined in claim 42 wherein said controlling means includes a pivoted element for operating said second valve means, and said controlling means further includes a buoyant element carried by said pivoted element for pivoting the latter to operate the second valve means.

44. The filler valve as defined in claim 42 wherein at least one of said adjacent surface is other than concentric to the other of said surfaces.

* * * * *